(12) United States Patent
Chin

(10) Patent No.: US 7,848,428 B2
(45) Date of Patent: Dec. 7, 2010

(54) SYSTEM AND METHOD FOR REDUCING VISIBLE ARTIFACTS IN VIDEO CODING USING MULTIPLE REFERENCE PICTURES

(75) Inventor: Douglas Chin, Haverhill, MA (US)

(73) Assignee: Broadcom Corporation, Irvine, CA (US)

( * ) Notice: Subject to any disclaimer, the term of this patent is extended or adjusted under 35 U.S.C. 154(b) by 1544 days.

(21) Appl. No.: 11/154,032

(22) Filed: Jun. 16, 2005

(65) Prior Publication Data

US 2005/0281329 A1 Dec. 22, 2005

Related U.S. Application Data

(60) Provisional application No. 60/580,950, filed on Jun. 17, 2004.

(51) Int. Cl.
*H04N 7/12* (2006.01)
(52) U.S. Cl. .............. 375/240.16; 375/240; 375/240.01; 375/240.12
(58) Field of Classification Search .......... 375/240, 375/240.01, 240.03, 240.12, 240.16; 348/699
See application file for complete search history.

(56) References Cited

U.S. PATENT DOCUMENTS 5,808,700 A * 9/1998 Sugimoto et al. ............ 348/699
6,072,831 A * 6/2000 Chen ..................... 375/240.03

\* cited by examiner

*Primary Examiner*—Allen Wong
(74) *Attorney, Agent, or Firm*—McAndrews Held & Malloy, Ltd.

(57) ABSTRACT

In video compression systems, a system and method for reducing visible artifacts in video coding using multiple reference pictures are provided. A first GOP characterized by a "bbIbbBbbBbbB" structure and a second GOP characterized by "bbIbbQbbMbbQ" GOP structure may be used to reduce "I" frame clicking. The "B," "b," "Q," and "M" pictures may be inter-coded by using multiple prediction dependencies, including dependency to a next GOP "I" picture, to smooth out discontinuities across GOPs in a video sequence. Prediction dependencies may be based on a weighing scheme where assigned weights are a function of the temporal distance between reference pictures and the picture being encoded. A first video compression system may be used for the first GOP and may encode "I," "B," and "b" pictures. A second video compression system may be used for the second GOP and may encode "I," "Q," "M," and "b" pictures.

18 Claims, 5 Drawing Sheets ing the encoded version of the source picture information. At a receiver or decoder side, the compressed difference picture is decoded and subsequently added to a predicted picture for display.
SYSTEM AND METHOD FOR REDUCING VISIBLE ARTIFACTS IN VIDEO CODING USING MULTIPLE REFERENCE PICTURES

CROSS-REFERENCE TO RELATED APPLICATIONS/INCORPORATION BY REFERENCE

This patent application makes reference to, claims priority to and claims benefit from U.S. Provisional Patent Application Ser. No. 60/580,950 filed on Jun. 17, 2004.

The above stated application is hereby incorporated herein by reference in its entirety.

FEDERALLY SPONSORED RESEARCH OR DEVELOPMENT

Not applicable.

MICROFICHE/COPYRIGHT REFERENCE

Not applicable.

FIELD OF THE INVENTION

Certain embodiments of the invention relate to the compression of video signals. More specifically, certain embodiments of the invention relate to a system and method for reducing visible artifacts in video coding using multiple reference pictures.

BACKGROUND OF THE INVENTION

In video compression systems, a source video sequence may be partitioned into successive groups of pictures or GOPs, where each picture or frame in the GOP may be of a pre-defined picture coding type. For example, in MPEG-2 applications, these picture coding types may comprise intra-coded pictures, predicted pictures, and bidirectional-predicted pictures. The intra-coded or "I" pictures may only use the information within the picture to perform video compression. These self-contained "I" pictures provide a base value or anchor that is an estimate of the value of succeeding pictures. Each GOP may generally start with a self-contained "I" picture as the reference or anchor frame from which the other frames in the group may be generated for display. A GOP may start with an "I" picture when describing the transmission, decoding, and/or processing order of a picture sequence, for example. A GOP may start with bidirectional-predicted pictures when describing the display order of a picture sequence, for example. The GOP frequency, and correspondingly the frequency or periodicity of "I" pictures, may be driven by specific application spaces. The predicted or "P" pictures may use a motion estimation scheme that generates motion vectors that may be utilized to predict picture elements from previously encoded pictures. Compressing the difference between predicted samples and the source value results in better coding efficiency than that which may be achieved by transmitting the encoded version of the source picture information. At a receiver or decoder side, the compressed difference picture is decoded and subsequently added to a predicted picture for display.

The bidirectional-predicted pictures or "B" pictures may use multiple pictures that occur in a future location in the GOP and/or in a past location in the GOP to predict the image samples. As with "P" frames, motion estimation may be used for pixel prediction in "B" pictures and the difference between the original source and the predicted pictures may be compressed. At the receiver or decoder end, one or more "B" pictures may be motion compensated and may be added to the decoded version of the compressed difference signal for display. Since both the "P" pictures and "B" pictures may be based on other pictures, they may be referred to as inter-coded pictures.

In the H.264 video standard, for example, pictures may be referred to as reference and non-reference pictures. The reference pictures may correspond to pictures that may be utilized to predict other pictures in a picture sequence, while the non-reference pictures may correspond to pictures that may be predicted from other reference pictures in a picture sequence. In this regard, the "I" pictures, "P" pictures, and/or "B" pictures may correspond to H.264 reference pictures, while only the "P" pictures, and/or "B" pictures may correspond to H.264 non-reference pictures, for example.

When the "I" picture in a GOP structure samples, for example, textured areas that are moving in a very consistent way, coding artifacts may be introduced and/or propagated to the remaining pictures in the GOP from the encoding of the "I" picture. The visible inconsistencies that arise at the boundary between a current GOP and a next GOP as a result of the artifacts introduced by the encoding of "I" pictures are known as "I picture clicking," "I picture popping," or "I frame clicking." Such visible artifacts are generally detrimental to video quality and are of particular concern in display applications where "I" pictures are utilized for accessing the video sequence and/or utilized as an anchor for additional video signal processing operations.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for reducing visible artifacts in video coding using multiple reference pictures, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a system and method for reducing visible artifacts in video coding using multiple reference pictures. By utilizing the flexibility in prediction dependencies provided by the H.264 or Advanced Video Coding (AVC) standard, novel group of pictures (GOP) structures may be constructed that reduce the artifacts that produce "I picture clicking," "I picture popping," or "I frame clicking." Note that the following discussion will generally use the terms "frame" and "picture" interchangeably. Accordingly, the scope of various aspects of the present invention should not be limited by notions of difference between the terms "frame" and "picture."

Figure 1:
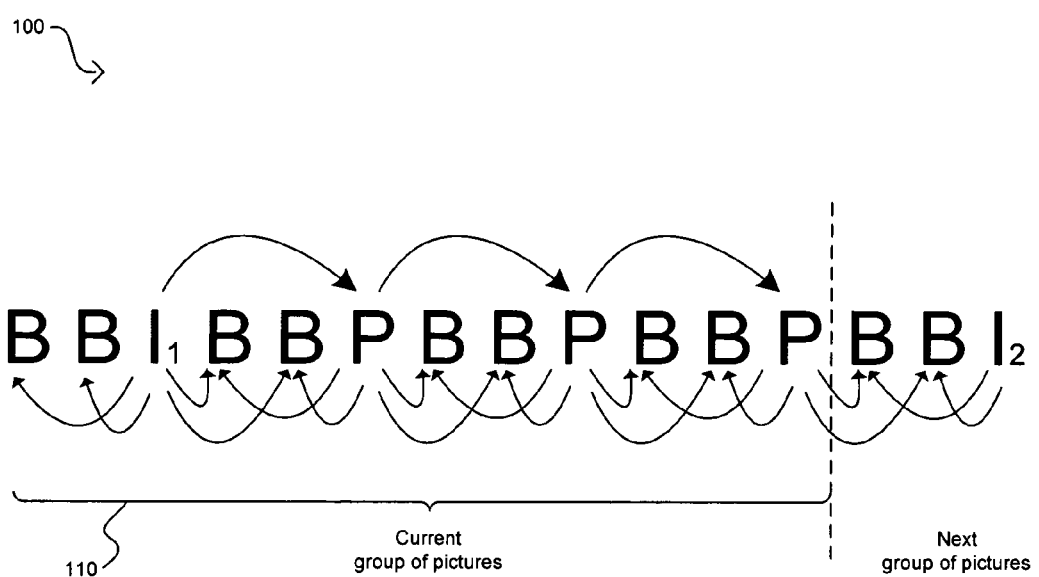
FIG. 1 is a diagram illustrating a conventional GOP structure, in connection with an embodiment of the invention.

FIG. 1 is a diagram illustrating a conventional GOP structure, in connection with an embodiment of the invention. Referring to FIG. 1, a conventional picture sequence 100 that may be utilized in, for example, MPEG-2 applications, may be characterized by a "BBIBBPBBPBBPBBI" sequence, where the "I" may represent an intra-coded picture, the "P" may represent a predicted inter-coded picture, and the "B" may represent a bidirectionally predicted inter-coded picture. In the picture sequence 100, a group of pictures (GOP) structure 110 may be characterized by a "BBIBBPBBPBBP" sequence. The remaining portion of the picture sequence 100 illustrated in FIG. 1 may correspond to a portion of a next GOP. The "$I_1$" picture illustrated in FIG. 1 corresponds to the "I" picture in the GOP structure 110 and the "$I_2$" picture corresponds to an "I" picture in the next GOP in the video sequence. The heads of the arrows indicate the destination of the predicted data, and the tails of the arrows indicate reference data. Such conventional picture sequence 100 may be conducive to trick play operation. For example, when presenting video information at 3× normal speed, only the "I" and "P" pictures are generally decoded. Also for example, when presenting video information at 12× speed, only the "I" pictures are generally decoded.

Note that encoding video data in accordance with various aspects of the present invention may be consistent from GOP-to-GOP or may vary depending on the characteristics of a particular video information scenario. For example, various aspects of the present invention may comprise determining when a particular video processing scenario is subject to visible artifacts or I-frame clicking. Also for example, various aspects of the present invention may comprise determining a particular portion of a video block or sequence that will be subject to visible artifacts. When it is determined that a particular video block, or portion thereof, is subject to such visible artifacts, video information may be encoded in a first manner, and when it is determined that a particular video block, or portion thereof, is not subject to such visible artifacts, video information may be encoded in a second manner. Accordingly, the scope of various aspects of the present invention should not be limited by the regularity with which video information is encoded in any particular manner.

Figure 2:
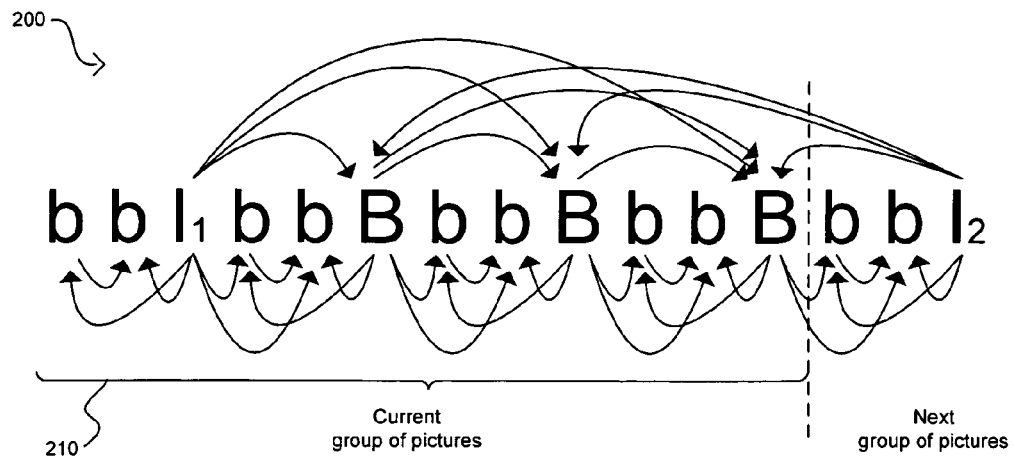
FIG. 2 is a diagram illustrating an exemplary first GOP structure for reducing visible artifacts that produce "I" picture clicking, in accordance with an embodiment of the invention.

FIG. 2 is a diagram illustrating an exemplary first GOP structure for reducing visible artifacts that produce "I" picture clicking, in accordance with an embodiment of the invention. Referring to FIG. 2, the picture sequence 200 may be characterized by a "bbIbbBbbBbbBbbI" sequence. In the picture sequence 200, a group of pictures (GOP) structure 210 may be characterized by a "bbIbbBbbBbbB" sequence. The remaining portion of the picture sequence 100 illustrated in FIG. 2 may correspond to a portion of a next GOP. The "I" in the picture sequence 200 may, for example, represent a picture that is spatially intra-coded and thus can be decoded without other reference pictures. The "B" in the picture sequence 200 may represent a picture that use a set of bidirectional vectors, where one of set of bidirectional vectors refer to a previous "B" or "I" picture in the current GOP, and another set of vectors refer to the next "I" picture. The "$I_1$" picture illustrated in FIG. 2 corresponds to the "I" picture in the GOP structure 210 and the "$I_2$" picture corresponds to an "I" picture in next GOP in the video sequence. In an exemplary scenario, by coding areas of such "B" pictures that would exhibit "I" frame clicking using consistent bidirectional vectors with a first set of vectors referencing the closest preceding picture that is either an "I" or "B" picture and a second set of vectors referencing the next "I" picture, the resulting video may exhibit a relatively smooth transition rather than a visible discontinuity. Referring to FIG. 2 for an illustration, the heads of the arrows indicate the destination of the predicted data, and the tails of the arrows indicate reference data.

Further, "b" may represent a picture that uses bidirectional vectors, where a first set of vectors may refer to any previous picture going back in time to the next previous picture that is either a "B" picture or an "I" picture, and a second set of vectors may refer to the next picture that is either a "B" picture or an "I" picture. Referring to FIG. 2 for an illustration, the heads of the arrows indicate the destination of the predicted data, and the tails of the arrows indicate reference data.

Figure 3:
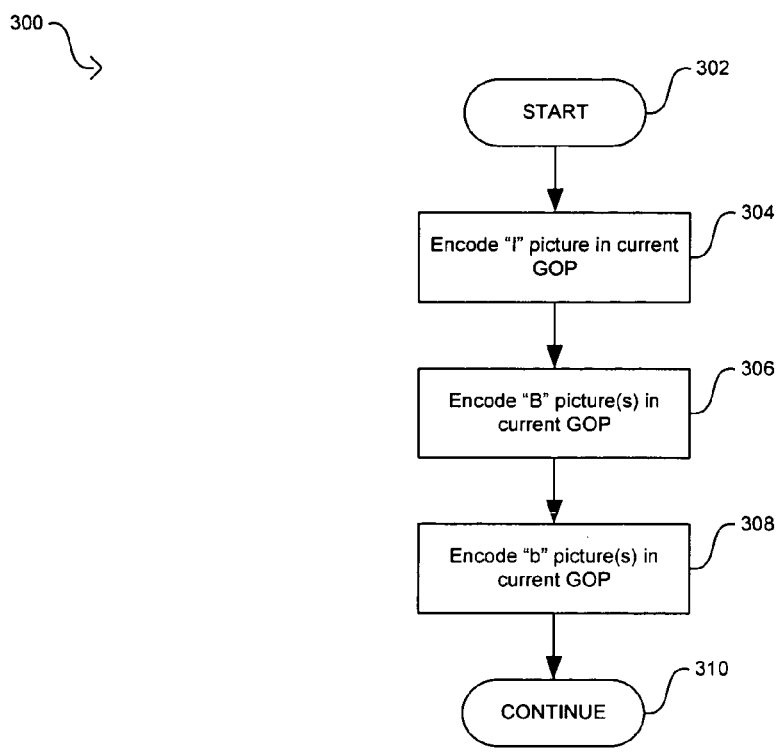
FIG. 3 is a flow diagram illustrating an exemplary method for processing video information in the first GOP structure, in accordance with an embodiment of the invention.

FIG. 3 is a flow diagram illustrating an exemplary method for processing video information in the first GOP structure, in accordance with an embodiment of the invention. Referring to FIG. 3, the flow diagram 300 corresponds to a method that produces encoded video information having characteristics of the first GOP structure or GOP structure 210 illustrated in FIG. 2. After start step 302, in step 304, the method may comprise intra-coding a current "I" picture in a current GOP structure 210. The "I" picture may, for example, be spatially intra-coded and decodable without referring to other pictures.

In step 306, the method may comprise inter-coding one or more "B" pictures in the current first GOP structure 210. Such inter-coding may, for example, comprise encoding the one or more "B" pictures using bidirectional sets of vectors. For example and without limitation, a first set of vectors may refer to a previous "B" or "I" picture in the current GOP structure 210, and a second set of vectors may refer to the next "I" picture. Note, however, that the scope of various aspects of the present invention should by no means be limited to single, double, triple or n-vector encoding.

Various aspects of the method may, for example, comprise coding areas of such "B" pictures that would exhibit "I" frame clicking under ordinary circumstances. The method may, for example, comprise coding such areas using consistent bidirectional vectors with a first set of vectors referencing the closest preceding picture that is either an "I" or "B" picture and a second set of vectors referencing the next "I" picture. In such an exemplary scenario, when decoded and presented in a visible form, the resulting encoded video may result in a relatively smooth transition rather than exhibit discontinuities.

In step 308, the method may comprise inter-coding one or more "b" pictures in the current GOP structure 210. Such inter-coding may, for example, comprise encoding the one or more "b" pictures using bidirectional vectors. For example and without limitation, a first set of vectors may refer to any previous picture going back in time to the next previous picture that is either a "B" picture or an "I" picture, and a second set of vectors may refer to the next picture that is either a "B" picture or an "I" picture. Note, however, that the scope of various aspects of the present invention should by no means be limited to single, double, triple or n-vector encoding. In continue step 310, when "I" picture intra-coding and "B" and "b" picture inter-coding are completed, processing of the current GOP structure 210 is completed and processing of the next GOP structure in the video sequence may proceed.

The method illustrated by flow diagram 300 may utilize various encoding algorithms using the bidirectional vector(s). For example, the method may comprise averaging predictive components corresponding to each of the bidirectional vectors. Alternatively, for example, the method may comprise utilizing a weighting scheme. For example and without limitation, a weighting scheme may comprise assigning weights corresponding to each reference picture, where the respective weights are a function of temporal distance between the reference picture and the picture being encoded. For example, the method may comprise assigning weights based on the type of reference picture, that is, "I" picture, "B" picture or "b" picture. In general, the method may utilize any of a large variety of encoding algorithms, and accordingly, the scope of various aspects of the present invention should not be limited by characteristics of any particular encoding algorithm.

Moreover, the method illustrated in FIG. 3 may require the output pictures to be reordered. In another embodiment, a single encoding module may be utilized to encode the three types of pictures. In this regard, the single encoding module may chose an order that encodes the pictures as early as possible in order to minimize buffering requirements, for example.

Figure 4:
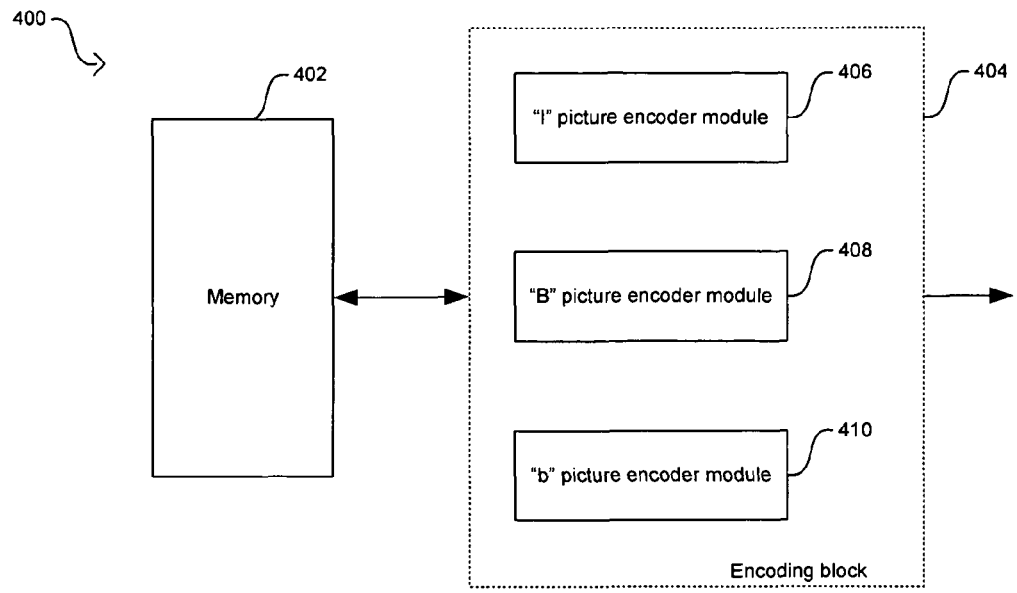
FIG. 4 is a block diagram of an exemplary video compression system for encoding the first GOP structure, in accordance with an embodiment of the invention.

FIG. 4 is a block diagram of an exemplary video compression system for encoding the first GOP structure, in accordance an embodiment of the invention. Referring to FIG. 4, the video compression system 400 may comprise a memory 402 and an encoding block 404. The encoding block 404 may comprise an "I" picture encoder module 406, a "B" picture encoder module 408, and a "b" picture encoder module 410. The exemplary video compression system 400 may, for example and without limitation perform the exemplary method illustrated in FIG. 3 and discussed previously. The exemplary video compression system 400 may, for example, produce encoded video information having characteristics of the exemplary GOP structure 210 illustrated in FIG. 2.

The memory 402 may comprise suitable logic, circuitry, and/or code that may be adapted to store video information. The memory 402 may, for example, store information of a plurality of GOPs or portions thereof. In an exemplary scenario, the memory 402 may store at least information of a current GOP and information of an "I" picture from a next GOP. Such information may, for example, be utilized to encode the video information for the current GOP, in accordance with various aspects of the present invention.

The "I" picture encoder module 406 may comprise suitable logic, circuitry, and/or code that may be adapted to intra-code a current "I" picture in a current GOP. For example, the "I" picture encoder module 406 may spatially intra-code the current "I" picture such that the encoded "I" picture may be decoded without referring to information of another picture.

The "B" picture encoder module 408 may comprise suitable logic, circuitry, and/or code that may be adapted to inter-code one or more "B" pictures in the current GOP. Such inter-coding may, for example, comprise encoding the one or more "B" pictures using bidirectional vectors. For example, the "B" picture encoder module may inter-code a "B" picture in the current GOP utilizing a first set of vectors referring to a previous "B" or "I" picture in the current GOP and a second set of vectors referring to the next "I" picture. Note, however, that the scope of various aspects of the present invention should not be limited to single, double, triple or n-vector encoding.

The "B" picture encoder module 408 may, for example, code "B" pictures, or areas thereof, that would exhibit visible artifacts, such as interface inconsistencies characterized by "I" frame clicking, for example, under ordinary circumstances. The "B" picture encoder module 408 may, for example, code such "B" pictures or areas thereof using consistent bidirectional vectors with a first set of vectors referencing the closest preceding picture that is either an "I" or "B" picture and a second set of vectors referencing the next "I" picture. In such an exemplary scenario, when decoded and presented in a visible form, the encoded video may result in a relatively smooth transition rather than exhibit discontinuities.

The "B" picture encoder module 408 may, for example, utilize various encoding algorithms using the bidirectional vectors. For example, the "B" picture encoder module 408 may average predictive components corresponding to each of the bidirectional vector(s). Alternatively, for example, the "B" picture encoder module 408 may utilize a weighting scheme. For example and without limitation, a weighting scheme may comprise assigning weights corresponding to each reference picture, where the respective weights are a function of temporal distance between the reference picture and the picture being encoded. In general, the "B" picture encoder module 408 may utilize any of a large variety of encoding algorithms, and accordingly, the scope of various aspects of the present invention should not be limited by characteristics of any particular encoding algorithm.

The "b" picture encoder module 410 may comprise suitable logic, circuitry, and/or code that may be adapted to inter-code one or more "b" pictures. The "b" picture encoder module 410 may, for example, encode the one or more "b" pictures using bidirectional vectors. For example and without limitation, a first set of vectors may refer to any previous picture going back in time to the next previous picture that is either a "B" picture or an "I" picture, and a second set of vectors may refer to the next picture that is either a "B" picture or an "I" picture. Note, however, that the scope of various aspects of the present invention should not be limited to single, double, triple or n-vector encoding.

Additionally, as mentioned previously regarding the "B" picture encoder module 408, the "b" picture encoder module 410 may utilize any of a large variety of encoding algorithms, and accordingly, the scope of various aspects of the present invention should not be limited by characteristics of any particular encoding algorithm. Moreover, portions of the "I" picture encoder module 406, the "B" picture encoder module 408, and/or the "b" picture encoder module 410 may be common in order to provide a more efficient implementation of the encoding block 404. In this regard, a single encoding module may be utilized in some instances for encoding "I" pictures, "B" pictures, and/or "b" pictures.

Figure 5:
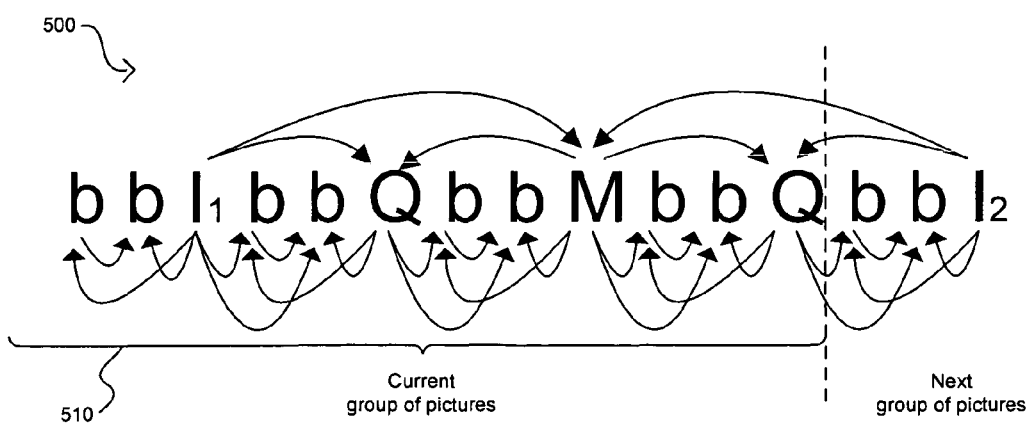
FIG. 5 is a diagram illustrating an exemplary second GOP structure for reducing visible artifacts that produce "I" picture clicking, in accordance with an embodiment of the invention.

FIG. 5 is a diagram illustrating an exemplary second GOP structure for reducing visible artifacts that produce "I" picture clicking, in accordance with an embodiment of the invention. Referring to FIG. 5, the picture sequence 500 may be characterized by a "bbIbbQbbMbbQbbI" sequence. In the picture sequence 500, a group of pictures (GOP) structure 510 may be characterized by a "bbIbbQbbMbbQ" sequence. The remaining portion of the picture sequence 500 illustrated in FIG. 5 may correspond to a portion of a next GOP. The "I"

may, for example, represent a picture that is spatially intra-coded and thus can be decoded without information of other pictures. The "$I_1$" picture illustrated in FIG. 5 corresponds to the "I" picture in the GOP structure 510 and the "$I_2$" picture corresponds to an "I" picture in the next GOP in the video sequence. The "M" may represent a picture that uses bidirectional vectors, where one of the vectors refers to the "I" picture in the current GOP, and another vector refers to the next "I" picture. In an exemplary scenario, an "M" picture may represent a bidirectional picture that divides the GOP in half. Referring to FIG. 5 for an illustration, the heads of the arrows indicate the destination of the predicted data, and the tails of the arrows indicate reference data.

The "Q" may represent a picture that uses bidirectional vectors, where one of the vectors refers to the closest previous "M," or "I" picture in the current GOP structure 510, and another vector refers to the closest next "M" or "I" picture. In an exemplary scenario, a "Q" picture may represent a bidirectional picture that divides a picture sequence formed by "I" and "M" pictures in half.

In an exemplary scenario, by coding areas of such "M" and "Q" pictures that would exhibit "I" frame clicking using consistent bidirectional vectors with a first set of vectors referencing the closest allowed preceding picture and a second set of vectors referencing the closest next "M" or "I" picture, the resulting video may exhibit a relatively smooth transition rather than a discontinuity when presented in a visible form. Referring to FIG. 5 for an illustration, the heads of the arrows indicate the destination of the predicted data, and the tails of the arrows indicate reference data.

Further, "b" may represent a picture that uses bidirectional vectors, where a first set of vectors may refer to any previous picture going back in time to the next previous picture that is either a "Q" picture or an "M" picture or an "I" picture, and a second set of vectors may refer to the next picture that is either a "Q" picture or an "M" picture or an "I" picture. Referring to FIG. 5 for an illustration, the heads of the arrows indicate the destination of the predicted data, and the tails of the arrows indicate reference data. Note that this exemplary GOP structure 510 provides for an additional benefit in that the structure provides for 6× fast play when decoding and playing only "I" and "M" pictures.

Figure 6:
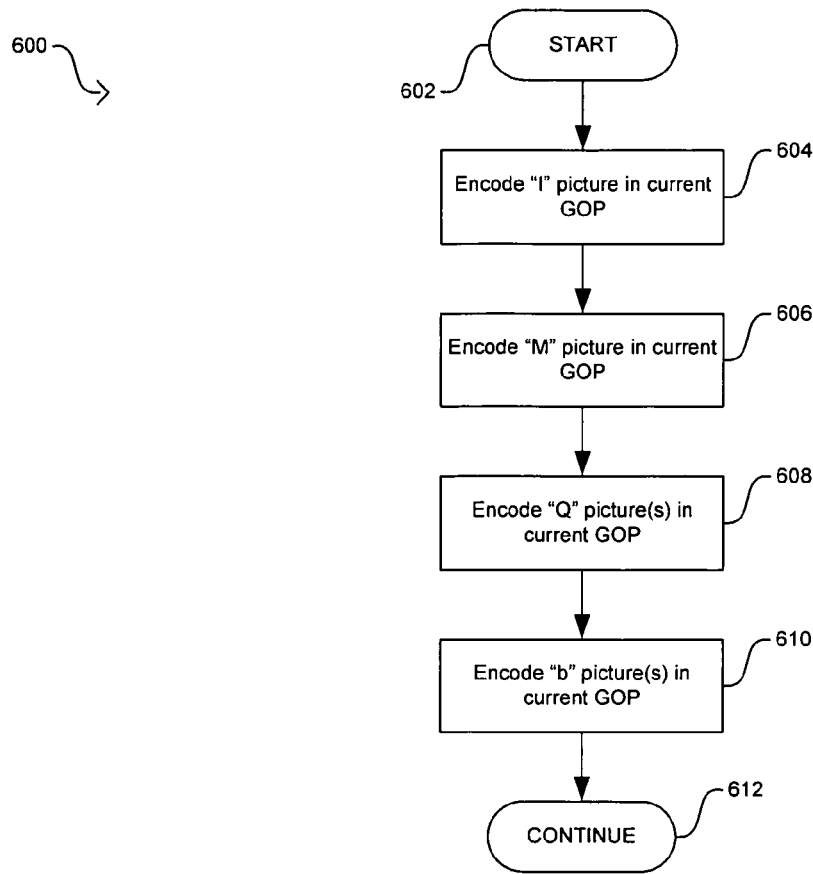
FIG. 6 is a flow diagram illustrating an exemplary method for processing video information in the second GOP structure, in accordance with an embodiment of the invention.

FIG. 6 is a flow diagram illustrating an exemplary method for processing video information in the second GOP structure, in accordance with an embodiment of the invention. Referring to FIG. 6, the flow diagram 600 corresponds to a method that produces encoded video information having characteristics of the second GOP structure or the GOP structure 510 illustrated in FIG. 5. After start step 602, in step 604, the method may comprise intra-coding a current "I" picture in a current GOP structure 510. The "I" picture may, for example, be spatially intra-coded and decodable without referring to other pictures.

In step 606, the method may comprise inter-coding an "M" picture in the current GOP structure 510. Such inter-coding may, for example, comprise encoding the "M" picture using bidirectional vectors. For example and without limitation, a first set of vectors may refer to a previous "I" picture in the current GOP structure 510, and a second set of vectors may refer to the next "I" picture or "$I_2$" picture. Note, however, that the scope of various aspects of the present invention should by no means be limited to single, double, triple or n-vector encoding.

In step 608, the method may comprise inter-coding one or more "Q" pictures in the current GOP structure 510. Such inter-coding may, for example, comprise encoding the one or more "Q" pictures using bidirectional vectors. For example and without limitation, a first set of vectors may refer to a previous "M" or "I" picture in the current GOP structure 510, and a second set of vectors may refer to the next "I" picture or "$I_2$" picture. Note, however, that the scope of various aspects of the present invention should by no means be limited to single, double, triple or n-vector encoding.

Various aspects of the method may, for example, comprise coding areas of such "M" and "Q" pictures that would exhibit "I" frame clicking or boundary inconsistencies under ordinary circumstances. The method may, for example, comprise coding such areas using consistent bidirectional vectors with a first set of vectors referencing the closest allowed preceding picture and a second set of vectors referencing the next "M" or "I" picture. In such an exemplary scenario, when decoded and presented in a visible form, the resulting encoded video may result in a relatively smooth transition rather than exhibit discontinuities.

In step 610, the method may comprise inter-coding one or more "b" pictures in the current GOP structure 510. Such inter-coding may, for example, comprise encoding the one or more "b" pictures using bidirectional vectors. For example and without limitation, a first set of vectors may refer to any previous picture going back in time to the next previous picture that is either a "Q" picture or a "M" picture or an "I" picture, and a second set of vectors may refer to the next picture that is either a "Q" picture or an "M" picture or an "I" picture. Note, however, that the scope of various aspects of the present invention should by no means be limited to single, double, triple or n-vector encoding. In continue step 612, when "I" picture intra-coding and "Q," "M" and "b" picture inter-coding are completed, processing of the current GOP structure 510 is completed and processing of the next GOP structure 510 in the video sequence may proceed.

The method illustrated by flow diagram 600 may utilize various encoding algorithms using the bidirectional vectors. For example, the method may comprise averaging predictive components corresponding to each of the bidirectional vectors. Alternatively, for example, the method may comprise utilizing a weighting scheme. For example and without limitation, a weighting scheme may comprise assigning weights corresponding to each reference picture, where the respective weights are a function of temporal distance between the reference picture and the picture being encoded. For example, the method may comprise assigning weights based on the type of reference picture, that is, "I" picture, "M" picture, "Q" picture or "b" picture. In general, the method may utilize any of a large variety of encoding algorithms, and accordingly, the scope of various aspects of the present invention should not be limited by characteristics of any particular encoding algorithm.

Moreover, the method illustrated in FIG. 6 may require the output pictures to be reordered. In another embodiment, a single encoding module may be utilized to encode the four types of pictures. In this regard, the single encoding module may chose an order that encodes the pictures as early as possible in order to minimize buffering requirements, for example.

Figure 7:
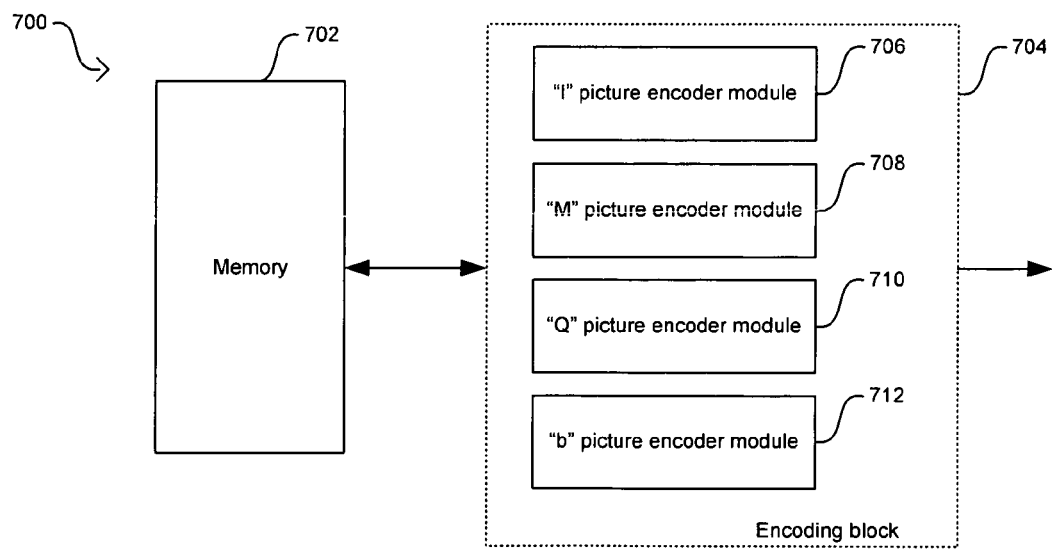
FIG. 7 is a block diagram of an exemplary video compression system for encoding the second GOP structure, in accordance with an embodiment of the invention.

FIG. 7 is a block diagram of an exemplary video compression system for encoding the second GOP structure, in accordance with an embodiment of the invention. Referring to FIG. 7, the video compression system 700 may comprise a memory 702 and an encoding block 704. The encoding block 704 may comprise an "I" picture encoder module 706, an "M" picture encoder module 708, a "Q" picture encoder module 710, and a "b" picture encoder 712. The exemplary video compression system 700 may, for example and without limitation perform the exemplary method illustrated in FIG. 6 and discussed previously. The exemplary video compression system 700 may, for example, produce encoded video information having characteristics of the exemplary GOP structure 510 illustrated in FIG. 5.

The memory 702 may comprise suitable logic, circuitry, and/or code that may be adapted to store video information. The memory 702 may, for example, store information of a plurality of GOPs or portions thereof. In an exemplary scenario, the memory 702 may store at least information of a current GOP and information of an "I" picture from a next GOP. Such information may, for example, be utilized to encode the video information for the current GOP, in accordance with various aspects of the present invention.

The "I" picture encoder module 706 may comprise suitable logic, circuitry, and/or code that may be adapted to intra-code a current "I" picture in a current GOP. For example, the "I" picture encoder module 706 may spatially intra-code the current "I" picture such that the encoded "I" picture may be decoded without referring to information of another picture.

The "M" picture encoder module 708 may comprise suitable logic, circuitry, and/or code that may be adapted to inter-code an "M" picture in the current GOP. Such inter-coding may, for example, comprise encoding the "M" picture using bidirectional vectors. For example and without limitation, a first set of vectors may refer to a previous "I" picture in the current GOP, and a second set of vectors may refer to the next "I" picture. Note, however, that the scope of various aspects of the present invention should by no means be limited to single, double, triple or n-vector encoding.

The "Q" picture encoder module 710 may comprise suitable logic, circuitry, and/or code that may be adapted to inter-code one or more "Q" pictures in the current GOP. Such inter-coding may, for example, comprise encoding the one or more "Q" pictures using bidirectional vectors. For example, the "Q" picture encoder module 710 may inter-code a "Q" picture in the current GOP utilizing a first set of vectors referring to a previous "M" or "I" picture in the current GOP and a second set of vectors referring to a next "I" picture. Note, however, that the scope of various aspects of the present invention should not be limited to single, double, triple or n-vector encoding.

The "M" picture encoder module 708 and/or "Q" picture encoder module 710 may, for example, code areas of such "M" and "Q" pictures that would exhibit "I" frame clicking under ordinary circumstances. The "M" picture encoder module 708 and/or "Q" picture encoder module 710 may, for example, code such areas using consistent bidirectional vectors with a first set of vectors referencing the closest allowed preceding picture and a second set of vectors referencing the next "M" or "I" picture. In such an exemplary scenario, when decoded and presented in a visible form, the resulting encoded video may result in a relatively smooth transition rather than exhibit discontinuities.

The "b" picture encoder module 712 may comprise suitable logic, circuitry, and/or code that may be adapted to inter-code one or more "b" pictures. The "b" picture encoder module 712 may, for example, encode the one or more "b" pictures using bidirectional vectors. For example and without limitation, a first set of vectors may refer to any previous picture going back in time to the next previous picture that is either an "I" picture or an "M" picture or a "Q" picture, and a second set of vectors may refer to the next picture that is either an "I" picture or an "M" picture or a "Q" picture. Note, however, that the scope of various aspects of the present invention should not be limited to single, double, triple or n-vector encoding.

Various modules of the system, that is, the "M" picture, "Q" picture and "b" picture encoder modules, may utilize various encoding algorithms using bidirectional vectors. For example, the various modules may average predictive components corresponding to each of bidirectional vectors. Alternatively, for example, the various modules may utilize a weighting scheme. For example and without limitation, a weighting scheme may comprise assigning weights corresponding to each reference picture, where the respective weights are a function of temporal distance between the reference picture and the picture being encoded. For example, the various modules may assign weights based on the type of reference picture, that is, "I" picture, "M" picture, "Q" picture or "b" picture. In general, the various modules may utilize any of a large variety of encoding algorithms, and accordingly, the scope of various aspects of the present invention should not be limited by characteristics of any particular encoding algorithm.

Moreover, portions of the "I" picture encoder module 706, the "M" picture encoder module 708, the "Q" picture encoder module 710, and/or the "b" picture encoder module 712 may be common in order to provide a more efficient implementation of the encoding block 704. In this regard, a single encoding module may be utilized in some instances for encoding "I" pictures, "M" pictures, "Q" pictures, and/or "b" pictures.

Figure 8:
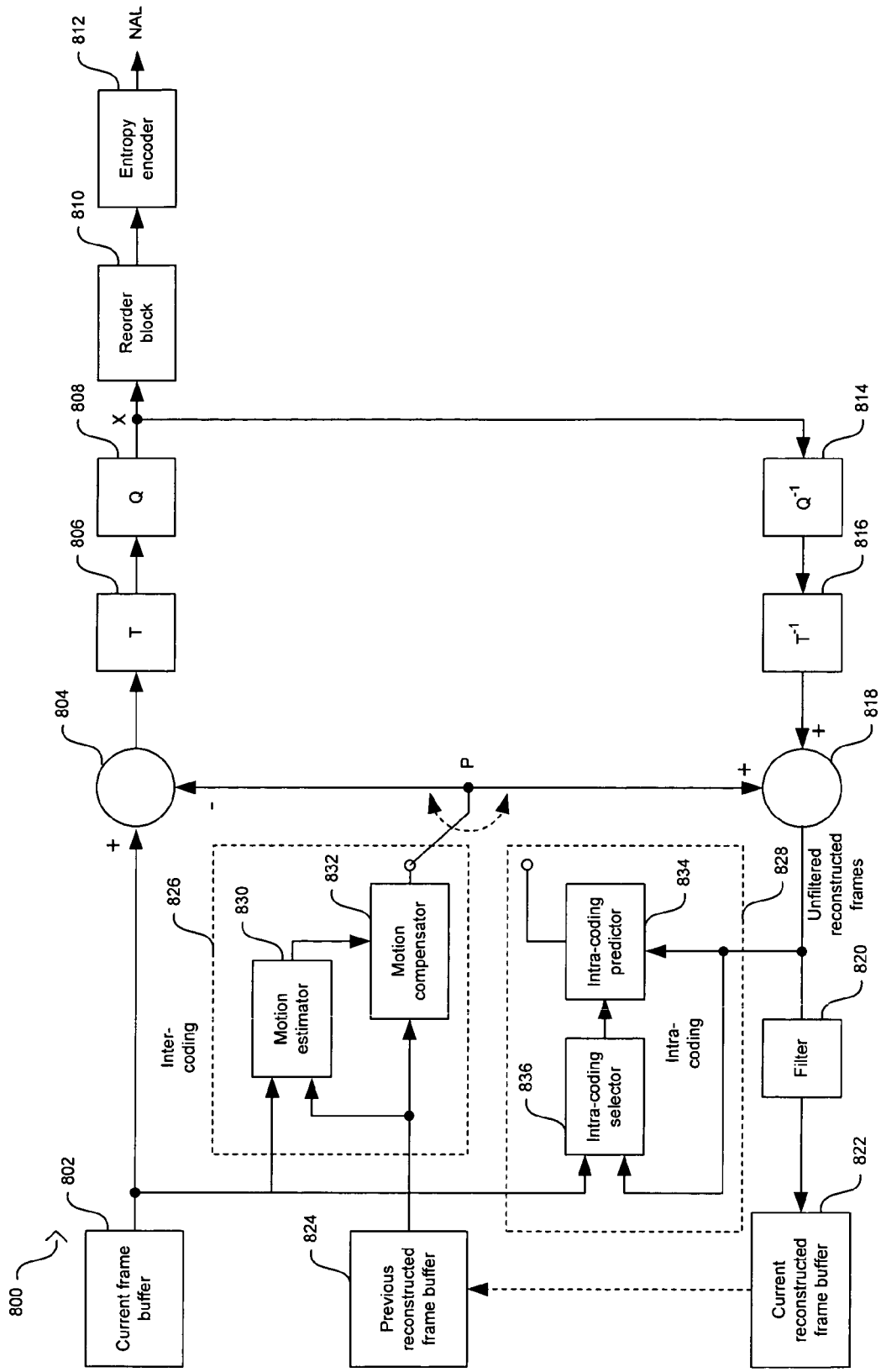
FIG. 8 is a block diagram of an exemplary video encoder, in accordance with an embodiment of the invention.

FIG. 8 is a block diagram of an exemplary video encoder, in accordance with an embodiment of the invention. Referring to FIG. 8, the video encoder 800 may comprise a current frame buffer 802, a first digital adder 804, a transformer (T) 806, a quantizer (Q) 808, a reorder block 810, an entropy encoder 812, a reverse quantizer ($Q^{-1}$) 814, a reverse transformer ($T^{-1}$) 816, a second digital adder 818, a filter 820, a current reconstructed frame buffer 822, a previous reconstructed frame buffer 824, an inter-coding section 826, and an intra-coding section 828.

The inter-coding section 826 may comprise a motion estimator 830 and a motion compensator 832. The inter-coding section 826 may, for example, comprise various inter-coding aspects of the exemplary systems illustrated in FIGS. 4 and 7 and discussed previously. Additionally, the inter-coding section 826 may, for example, perform various inter-coding aspects of the exemplary methods illustrated in FIGS. 3 and 6 and discussed previously.

The intra-coding section 828 may comprise an intra-coding selector 834 and an intra-coding predictor 836. The intra-coding section 828 may, for example, comprise various intra-coding aspects of the exemplary systems illustrated in FIGS. 4 and 7 and discussed previously. Additionally, the intra-coding section 828 may, for example, perform various inter-coding aspects of the exemplary methods illustrated in FIGS. 3 and 6 and discussed previously.

Upon encoding video information in accordance with various aspects of the present invention, such encoded information may be utilized in further processing. For example and without limitation, such encoded information may be utilized to manufacture computer-usable media. Such computer-usable media may comprise Digital Versatile Disks (DVDs), Compact Disks (CDs), hard drives, memory chips, and other memory devices. Signal processing devices may then, operating in accordance with information stored on such memory devices, present video information to a user in an efficient manner and with reduced visible artifacts.

Such encoded information may also be utilized in broadcast, multi-cast, or uni-cast transmission systems to communicate video information to one or more receiving entities in an efficient manner while providing a mechanism for the reduction of visible artifacts in communicated video information. In general, such encoded information may be further processed. Accordingly, the scope of various aspects of the present invention should not be limited by characteristics of particular further processing Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video information, the method comprising:
    intra-coding a current intra-frame ("I") picture in a current group of pictures (GOP);
    inter-coding a first bi-directional ("B") picture in said current GOP, wherein said encoded first "B" picture utilizes a first set of vectors that refer to said current "I" picture, and a second set of vectors that refer to a next "I" picture in a next GOP;
    inter-coding a second "B" picture in said current GOP, wherein said encoded second "B" picture utilizes a first set of vectors that refer to said current "I" picture or said first "B" picture, and a second set of vectors that refer to said next "I" picture; and
    inter-coding at least one additional "B" picture in said current GOP, wherein said encoded at least one additional "B" picture utilizes a set of vectors that refer to an immediately previous "B" picture and a set of vectors that refer to an immediately subsequent "B" picture.

2. The method according to claim 1, further comprising inter-coding a third "B" picture in said current GOP, wherein said encoded third "B" picture utilizes a first set of vectors that refer to said current "I" picture or said first "B" picture or said second "B" picture, and a second set of vectors that refer to said next "I" picture.

3. The method according to claim 2, further comprising inter-coding a plurality of "b" pictures, wherein each of said encoded plurality of "b" pictures utilize a first set of vectors that refer to a picture ranging from a previous "B" picture or "I" picture, whichever is closer, to a picture immediately prior to said encoded "b" picture, and a second set of vectors that refer to a next "B" picture or "I" picture, whichever is closer.

4. The method according to claim 1, wherein at least one "b" picture separates said first "B" picture from said current "I" picture.

5. The method according to claim 1, wherein at least one "b" picture separates said second "B" picture from said next "I" picture.

6. The method according to claim 1, wherein at least one "b" picture separates a current "B" picture from a next "B" picture.

7. A system for processing video information, the system comprising:
    a memory comprising information of pictures of a current group of pictures (GOP) and at least a portion of a next GOP;
    a single encoder comprising an intracoded ("I") picture encoder portion and a bidirectional "B" picture encoder portion;
    said "I" picture encoder portion intra-codes a current "I" picture; and
    said "B" picture encoder portion inter-codes:
    a first "B" picture in said current GOP utilizing a first set of vectors that refer to said current "I" picture and a second set of vectors that refer to a next "I" picture of a next GOP; and
    a second "B" picture in said current GOP utilizing a first set of vectors that refer to said current "I" picture or said first "B" picture, and a second set of vectors that refer to said next "I" picture; and
    wherein said "B" picture encoder portion inter-codes at least one additional "B" picture in said current GOP, wherein said encoded at least one additional "B" picture utilizes a set of vectors that refer to an immediately previous "B" picture and a set of vectors that refer to an immediately subsequent "B" picture.

8. The system according to claim 7, wherein said "B" picture encoder portion further inter-codes a third "B" picture in said current GOP utilizing a first set of vectors that refer to said current "I" picture or said first "B" picture or said second "B" picture, and a second set of vectors that refer to said next "I" picture.

9. The system according to claim 8, wherein said single encoder further comprising a "b" picture encoder portion that inter-codes a plurality of "b" pictures, wherein each of said plurality of encoded "b" pictures utilize a first set of vectors that refer to a picture ranging from a previous "B" picture or "I" picture, whichever is closer, to a picture immediately prior to said encoded "b" picture, and a second set of vectors vector that refer to a next "B" picture or "I" picture, whichever is closer.

10. The system according to claim 7, wherein said single encoder determines an encoding order for encoding pictures in a picture sequence.

11. A method for processing video information, the method comprising:
    intra-coding a current intracoded ("I") picture in a current group of pictures (GOP);
    inter-coding a first bidirectional ("B") picture in said current GOP, wherein said encoded first "B" picture utilizes a first set of vectors that refer to said current "I" picture, and a second set of vectors that refer to a next "I" picture in a next GOP;
    inter-coding a second "B" picture in said current GOP, wherein said encoded second "B" picture utilizes a first set of vectors that refer to said current "I" picture or said first "B" picture, and a second set of vectors that refer to said next "I" picture; and inter-coding a third "B" picture in said current GOP, wherein said encoded third "B" picture utilizes a first set of vectors that refer to said current "I" picture or said first "B" picture or said second "B" picture, and a second set of vectors that refer to said next "I" picture.

12. The method according to claim 11, further comprising inter-coding a plurality of "b" pictures, wherein each of said encoded plurality of "b" pictures utilize a first set of vectors that refer to a picture ranging from a previous "B" picture or "I" picture, whichever is closer, to a picture immediately prior to said encoded "b" picture, and a second set of vectors that refer to a next "B" picture or "I" picture, whichever is closer.

13. The method according to claim 11, wherein at least one "b" picture separates said first "B" picture from said current "I" picture.

14. The method according to claim 11, wherein at least one "b" picture separates said second "B" picture from said next "I" picture.

15. The method according to claim 11, wherein at least one "b" picture separates a current "B" picture from a next "B" picture.

16. A system for processing video information, the system comprising:
   a memory comprising information of pictures of a current group of pictures (GOP) and at least a portion of a next GOP;
   a single encoder comprising an "I" picture encoder portion and a "B" picture encoder portion;
   said "I" picture encoder portion intra-codes a current "I" picture; and
   said "B" picture encoder portion inter-codes:
   a first "B" picture in said current GOP utilizing a first set of vectors that refer to said current "I" picture and a second set of vectors that refer to a next "I" picture of a next GOP; and
   a second "B" picture in said current GOP utilizing a first set of vectors that refer to said current "I" picture or said first "B" picture, and a second set of vectors that refer to said next "I" picture; and
   wherein said "B" picture encoder portion further inter-codes a third "B" picture in said current GOP utilizing a first set of vectors that refer to said current "I" picture or said first "B" picture or said second "B" picture, and a second set of vectors that refer to said next "I" picture.

17. The system according to claim 16, wherein said single encoder further comprising a "b" picture encoder portion that inter-codes a plurality of "b" pictures, wherein each of said plurality of encoded "b" pictures utilize a first set of vectors that refer to a picture ranging from a previous "B" picture or "I" picture, whichever is closer, to a picture immediately prior to said encoded "b" picture, and a second set of vectors vector that refer to a next "B" picture or "I" picture, whichever is closer.

18. The system according to claim 16, wherein said single encoder determines an encoding order for encoding pictures in a picture sequence.

* * * * *